Inventors
CYRUS W. BEMMELS
DONALD F. DOEHNERT
By Charles C. Harris
Attorney

United States Patent Office
3,707,518
Patented Dec. 26, 1972

3,707,518
ACRYLATE ADHESIVE TAPE AND
COMPOSITION
Cyrus W. Bemmels, North Brunswick, and Donald F. Doehnert, Millington, N.J., assignors to Johnson & Johnson
Original application July 11, 1968, Ser. No. 744,123, now Patent No. 3,617,362, dated Nov. 2, 1971. Divided and this application Sept. 25, 1970, Ser. No. 75,659
Int. Cl. C08f 45/24, 45/34
U.S. Cl. 260—29.6 NR
2 Claims

ABSTRACT OF THE DISCLOSURE

A self cross-linking pressure-sensitive acrylate adhesive and tape based on an adhesive copolymer of monomers comprising a major amount of a medium chain length alkyl acrylate monomer and preferably a minor amount of a cohesion inducing short chain monomer, plus a very small amount of an alkoxy silyl polymerizable cross-linking monomer and a relatively small amount, i.e., about 2-6 parts by weight of the total monomer solids, of a catalytic acid monomer selected from the group consisting of acrylic acid, methacrylic acid, and itaconic acid. The catalytic acid monomer acts as a built-in or internal catalyst which causes the adhesive copolymer to be self cross-linking. A stabilization system for this self cross-linking system also is disclosed.

---

Figure 1:
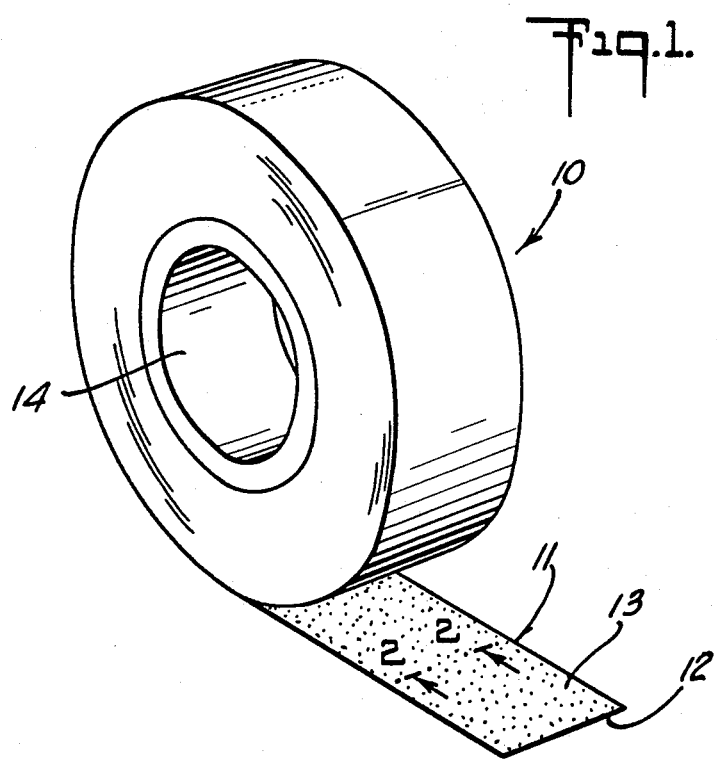

This application is a division of our co-pending application, Ser. No. 744,173, filed July 11, 1968, now U.S. 3,617,362, and it is directed to species which were non-elected in said co-pending application.

The present invention relates to pressure-sensitive adhesive sheets and tapes and pressure-sensitive adhesives therefor and more particularly to pressure-sensitive acrylate adhesive products.

Pressure-sensitive adhesives based upon acrylate copolymers are well known for their many fine qualities, principally for their ability to provide the desired tack without the addition of a tackifying resin and for their outstanding clarity. However, these adhesives are sensitive to heat and solvents and are adversely affected thereby. Various proposals have been made for cross-linking acrylate adhesives to increase their resistance to heat and solvents. However, these usually have resulted in products which lack the other properties, such as tack, which are necessary in a pressure-sensitive adhesive.

We have invented a novel acrylate pressure-sensitive adhesive product in which the acrylate copolymer is self cross-linking and, when cross-linked, possesses excellent resistance to solvents and to shear at normal and elevated temperatures as well as the desired balance of tack, hold, cohesive strength and other properties which are so difficult to obtain in cross-linked copolymers of this type. We have discovered that the desired performance characteristics of the adhesive products of this invention are closely related to the plasticity of the adhesive. Thus, we have determined that the dried and cross-linged adhesive according to this invention should have a Williams Plasticity of about 2.0–3.0 for best results, although adhesives having somewhat higher and lower plasticities also may be used to contribute the desired balance of physical properties to the resulting adhesive product.

The pressure-sensitive adhesive product of this invention is based upon an adhesive copolymer of monomers which consists essentially of a major amount of a medium chain length alkyl acrylate monomer and preferably a minor amount of a cohesion inducing short chain monomer, plus a very small amount of an alkoxy silyl cross-linking monomer polymerizable in the acrylate system. These monomers are copolymerized together with a relatively small amount of a particular type of catalytic acid monomer which acts as a built-in or internal catalyst which causes the adhesive copolymer to be self cross-linking.

The medium chain length alkyl acrylate monomers of this invention generally are those averaging about 4–12 carbon atoms in the alcohol moiety and include, butyl, hexyl, 2 ethylhexyl, octyl, decyl, and dodecyl acrylates, and the like, alone or in combination with one another or with higher and lower alkyl acrylates. The medium chain length acrylate monomer is present in the adhesive copolymer of this invention in a major amount by weight of the total monomers, preferably in the amount of about 60–80 parts by weight of the monomers. When the term "parts" is used above and hereinafter in this application, it shall mean parts per 100 parts by weight of the total monomer solids, unless otherwise indicated.

The cohesion inducing short chain monomers of this invention generally are selected from vinyl acetate, methyl acrylate, methyl methacrylate, and the like, and preferably are present in the total monomers in the amount of about 10–30 parts, preferably above about 15 parts.

The alkoxy silyl cross-linking monomer of this invention may be prepared as described in U.S. patent application Ser. No. 399,837, filed Sept. 28, 1964, now abandoned, and comprises an alkoxy silyl alkyl group and an unsaturated functional terminal group copolymerizable with the other monomers. This functional terminal group preferably is an acrylate or substituted acrylate group such as

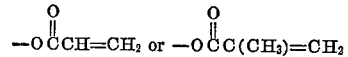

The polymerizable cross-linking alkoxy silyl alkyl groups found to be particularly effective are those having the general formula

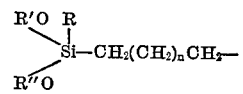

where R' and R" are either $CH_3$— or $CH_3CH_2$— and R is one of the group consisting of $CH_3$—, $CH_3CH_2$, $CH_3O$— and $CH_3CH_2O$—, and $n$ is a number of 0 through 8. A preferred silyl cross-linking monomer is 3-methacryloxy-propyltrimethoxy-silane, i.e.,

The amount of the silyl cross-linking monomer to be included in the copolymer depends on the exact constituents of the copolymer and the degree of cross-linking desired. Very small amounts are found to be effective. The silyl cross-linking monomer will generally be included in amounts of about 0.005 to 0.1 or 0.2 or more by weight of the total monomers with about 0.01–0.05 parts being preferred.

The catalytic acid monomers of this invention generally are selected from acrylic acid, methacrylic acid and itaconic acid, with acrylic acid being preferred. They are present in the total monomers in the amount of about 2–6 parts, preferably 2.5–4.5 parts when acrylic acid is employed for this purpose.

The adhesive copolymer composition of this invention preferably is produced by mixing the monomers in the desired proportions to form a monomer mix and then polymerizing the mixture in an oxygenated organic solvent such as acetone, tertiary butyl alcohol, diacetone alcohol, or the like, or a mixture of these with one another or with an additional organic solvent, utilizing a suitable catalyst for the polymerization reaction. Preferably, the polymerization is conducted in several stages employing a combination of organic peroxide catalysts. For instance benzoyl peroxide may be employed to initiate the reaction in the first stage or stages, and a relatively thermally active catalyst such as 2,4-dichlorobenzoyl peroxide may be added in the final stage to increase the yield. Then an aliphatic diluent is added to achieve the desired copolymer solution viscosity and solids content.

Self cross-linking of the existing copolymer begins and continues slowly throughout the polymerization reaction. However, the resulting copolymer is only partially cross-linked when polymerization is completed. Since the copolymer is self cross-linking at normal room temperatures and proceeds more rapidly at normal drying temperatures in the neighborhood of 200° F., or less, it will continue to cross-link and increase in viscosity in the copolymer solution. As a result, the solution must be coated on the backing sheet within a reasonable period of time such as four to six weeks after polymerization is completed to avoid the excessive thickening, due to cross-linking, which would interfere with coating.

According to our invention, this problem can be avoided by adding a small amount of water or alcohol or both to the adhesive solution shortly after polymerization is completed to retard the cross-linking reaction and thereby increase the "pot life" of the copolymer solution. The water or alcohol solution stabilizer preferably is added in the amount of at least about one percent water or five percent alcohol by weight of the total solution to give best results. It is estimated that this will increase the "pot life" of the adhesive solution to over six months under normal conditions. After the adhesive copolymer solution is coated on the backing at the desired viscosity, the remaining cross-linking is completed after the adhesive is dried. The presence of the water or alcohol in the adhesive solution does not affect the plasticity or performance of the adhesive after it is dried.

Thus the acrylate adhesive of this invention is fully cross-linked in situ without the addition of an external cross-linking catalyst or any other contaminant. The catalytic acid monomer becomes part of the adhesive copolymer, itself, and contributes to the properties of the resulting pressure-sensitive adhesive sheet or tape.

Figure 2:
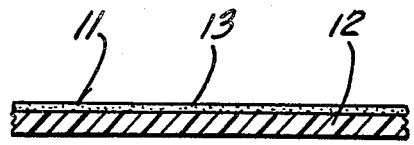

Other and further advantages of this invention will appear to one skilled in the art from the following description and claims, wherein:

FIG. 1 is a view in perspective of a roll of tape according to one embodiment of the invention, and FIG. 2 is a greatly enlarged fragmental sectional view taken along the line 2—2 of FIG. 1.

Referring to the drawings, there is shown a roll 10 of pressure-sensitive adhesive tape 11, according to one embodiment of this invention, which comprises a flexible backing sheet 12 and a layer 13 of pressure-sensitive adhesive composition according to this invention coated on one major surface of said backing. The tape 11 normally is wound upon itself around a core 14 with the adhesive side of the tape facing inwardly toward the core. The backing sheet 12 may be a plastic film, paper, or any other suitable backing material and the tape may include various other layers or coatings, such as primers, release coatings, and the like, which are used in the manufacture of pressure-sensitive adhesive tapes.

The following examples are given only by way of illustration and are not intended to limit the scope of the present invention in any way. In the examples all proportions are given in parts per one hundred parts by weight of the total adhesive monomer unless otherwise indicated.

EXAMPLE I

A monomer mix according to this invention is formulated as follows and stirred until thoroughly mixed.

| Monomer: | Parts |
|---|---|
| 2-ethylhexylacrylate | 75.0 |
| Vinyl acetate | 22.0 |
| Acrylic acid | 3.0 |
| 3-methacryloxypropyltrimethoxy-silane | 0.05 |

Polymerization is then conducted as follows:

| Charge into reactor: | Parts |
|---|---|
| Acetone | 67.0 |
| Benzoyl peroxide | 0.5 |
| ⅓ monomer mix | 33.3 |

Heat to reflux temperature (57° C.) and stir for one hour. The entire polymerization reaction is run so as to maintain a gentle reflux of the acetone solvent. Then add ⅓ monomer mix—33.3 parts
Heat for an additional hour at reflux..
Then add

| | Parts |
|---|---|
| ⅓ monomer mix | 33.45 |
| 2,4-dichlorobenzoyl peroxide, 50% solids in dibutylphthalate | 0.5 |

Continue heating and stirring at reflux for an additional six hours. Then add
Aliphatic diluent—119.0 parts When the aliphatic diluent is thoroughly mixed with the partially cross-linked copolymer, a water white adhesive solution containing about 35 percent copolymer solids is obtained. To this is added 8 percent isopropyl alcohol based on the total solution weight to provide a stabilized adhesive solution with an extensive "pot life," i.e., it doesn't gel for an extensive period, say for six months, and therefore is coatable on a suitable backing.

The stabilized copolymer solution of this invention then is coated onto a polyethylene terephthalate film about 1.5 mils thick and dried for 5 minutes at 200° F. in a forced air oven to give a dry adhesive coating weighing about 0.9 plus or minus about 0.1 ounce per square yard. The resulting coated film then is slit into pressure-sensitive adhesive tapes about one inch wide which are wound upon themselves in the form of rolls. The tapes are tested for adhesion to steel, hold to chrome and tack or quick stick and are found to have excellent properties over a wide range of temperatures as indicated in the following Table A. These properties are determined in this and subsequent examples by the following tests.

The adhesive strength or peel adhesion to steel is measured by peeling the tape backing over itself 180° at a constant speed (by a force applied to the free end of the tape) from a smooth steel surface to which it has been applied by a fixed pressure. For the techniques used in conducting this test, see the 180° peel adhesion test PSTC-1 of the Pressure-Sensitive Tape Council.

Quick stick is measured by laying a length of tape, adhesive side up, upon a horizontal surface and then rolling a hollow plastic ball down an incline onto the adhesive. The vertical height at which the ball starts and the distance the ball rolls along the tape before coming to rest is measured. Quick stick is reported as the height in inches raised to the three-halves power, divided by the distance rolled in inches. This ratio is found to be a constant for a given tape. The ball is plastic and approximately 1.5 inches in diameter, and weighs approximately 2 grams. Its outer surface is carefully cleaned between each test.

Hold to chrome is measured in terms of the time taken to strip a specified tape sample from a one-half (½) inch by one-half (½) inch chrome-plated surface by attaching a 400 gram weight to the bottom end of the tape when the surface is disposed at 20° to the vertical and the tape is hanging at an angle of 20° to the adjacent portion of the chrome-plated surface from which it is being removed.

Williams plasticity is determined as follows. A wet film of the solution adhesive is coated on silicone release paper so as to produce a dry film approximately 1½ mils in thickness. It is dried five minutes at 195–200° F. in a circulating air oven. The adhesive is removed from the silicone paper and a pellet exactly 2 grams in weight is formed in the shape of a ball. The sample ball is placed between two plasticity papers and conditioned for 15 minutes at 100° F. The plasticity papers consist of papers with a highly glossy clay coated urface facing the plasticity pellet. The Williams plasticity is the thickness of the pellet in mm. after 15 minutes compression at 100° F. in the plastometer under a 5 kg. load.

The desired balance of pressure-sensitive adhesive properties according to this invention is best achieved with a peel adhesion of at least about 25 ounces per inch of width, a quick stick of at least about 0.4 or 0.5, preferably above 1, and a hold to chrome of at least about 1 hour.

In the following additional examples the indicated monomers are copolymerized in the formulations described in Table A. They then are made into tapes and tested as in Example I. The results also are given in Table A.

TABLE A

| Example | I | II | III | IV | V |
|---|---|---|---|---|---|
| 2-ethylhexyl acrylate, parts | 75 | 72 | 75 | 75 | 94 |
| Vinyl acetate, parts | 22 | | | 22 | |
| Methyl acrylate, parts | | 21 | 22 | | |
| Acrylic acid, parts | 3 | 4 | 6 | 3 | 6 |
| 3-methacryloxy-propyl-trimethoxysilane, parts | 0.05 | 0.02 | 0.01 | 0.02 | 0.05 |
| Polymerization solvents and proportions [1] | 100 A | {50 A, 50 EA} | {54 A, 46 EA} | {28 A, 72 EA} | {37 A, 63 EA} |
| Approximate percent solids content | 35 | 28 | 25 | 25 | 28 |
| Williams plasticity | 2.00 | 2.30 | 2.51 | 2.7 | 1.93 |
| Adhesion, oz./in. width | 40 | 30 | 42 | 35 | 30 |
| Quick stick | 2.0 | 1.2 | 0.4 | 1.2 | 1.2 |
| Hold to chrome, mins. (75° F.) | 105 | 60 | 110 | 1,500 | 150 |

[1] "A" means acetone and "EA" means ethyl acetate.

The above adhesives are crystal clear and exhibit plasticities within the desired range and the resulting tapes possess excellent hold and other adhesive properties.

Samples of each of the adhesive copolymers of Examples II–V are stabilized by the addition of about 1.5 percent water to the adhesive solution after polymerization. This effectively retards cross-linking so that the adhesive remains coatable within a reasonable period of time, in the order of six months.

Having now described the invention in specific detail and exemplified the manner in which it may be carried into practice, it will be readily apparent to those skilled in the art that innumerable variatiaons, applications, modifications, and extensions of the basic principles involved may be made without departing from its spirit or scope.

What is claimed is:

1. A pressure-sensitive adhesive composition which comprises a copolymer of monomers consisting essentially of
    (a) a major amount by weight of the total monomer solids of a medium chain length alkyl acrylate monomer averaging about 4–12 carbon atoms in the alcohol moiety,
    (b) about 2–6 parts per 100 parts by weight of the total monomer solids of a catalytic acid monomer selected from the group consisting of acrylic acid, methacrylic acid, and itaconic acid, and
    (c) about 0.005–0.2 parts per 100 parts by weight of the total monomer solids of an alkoxy silyl cross-linking monomer comprising alkoxy silyl alkyl groups according to the following general formula:

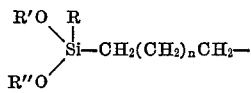

where R' and R" are either $CH_3$— or $CH_3CH_2$—, and R is one of the group consisting of $CH_3$—, $CH_3CH_2$—, $CH_3O$— and $CH_3CH_2O$—, and $n$ is a number of 0 through 8, and having an unsaturated functional terminal group according to either of the following general formulae:

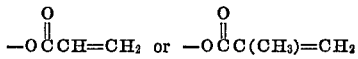

said copolymer being self cross-linking at normal room temperatures and being in a solution which includes the polymerization solvent; said solution also including at least about one percent of water or at least about 5 percent of alcohol by weight of the total solution as a viscosity stabilizer.

2. A pressure-sensitive adhesive composition according to claim 1, which comprises at least about 5 percent by weight of the total solution of isopropyl alcohol.

References Cited

UNITED STATES PATENTS

| 3,453,230 | 7/1969 | Plueddemann | 260—86.1 R |
| 3,408,420 | 10/1968 | Wiggill | 260—827 |
| 3,467,634 | 9/1969 | Jacknow | 260—80.71 |
| 3,186,965 | 6/1965 | Plueddemann | 260—86.1 R |
| 3,480,584 | 11/1969 | Archer | 260—86.1 R |
| 3,423,376 | 1/1969 | Gobran | 260—80.71 |

MORRIS LIEBMAN, Primary Examiner

P. R. MICHL, Assistant Examiner

U.S. Cl. X.R.

260—29.6 TA, 33.4 R, 78.5 R, 80.71